United States Patent [19]

Oda et al.

[11] Patent Number: 5,414,456
[45] Date of Patent: May 9, 1995

[54] SIGNAL RECEIVING APPARATUS WITH AUTOMATICALLY ACTIVATED SCRAMBLED SIGNAL DECODER

[75] Inventors: Osamu Oda, Saitama; Toshio Amano, Kanagawa, both of Japan

[73] Assignee: Sony Corporation, Tokyo, Japan

[21] Appl. No.: 272,860

[22] Filed: Jul. 8, 1994

Related U.S. Application Data

[63] Continuation of Ser. No. 967,211, Oct. 27, 1992, abandoned.

[30] Foreign Application Priority Data

Nov. 6, 1991 [JP] Japan ............... 3-290207

[51] Int. Cl.⁶ .............................. H04N 7/167
[52] U.S. Cl. ........................ 348/10; 455/3.2; 455/6.2; 380/10
[58] Field of Search ............ 455/3.1, 3.2, 4.2, 6.2, 455/6.1; 380/9, 10, 20; 348/10; H04N 7/16, 7/167

[56] References Cited

U.S. PATENT DOCUMENTS

| | | | |
|---|---|---|---|
| 4,558,464 | 10/1985 | O'Brien, Jr. ............... | 455/6.2 X |
| 4,866,787 | 9/1989 | Olesen ..................... | 455/3.2 |
| 4,985,772 | 1/1991 | Long et al. ................ | 455/4.2 X |
| 5,003,591 | 3/1991 | Kauffman et al. .......... | 380/10 |

*Primary Examiner*—Reinhard J. Eisenzopf
*Assistant Examiner*—Philip J. Sobutka
*Attorney, Agent, or Firm*—Jay H. Maioli

[57] ABSTRACT

In a scrambled signal receiving apparatus connectable to a television receiver equipped with a BS (broadcasting satellite) tuner, the scrambled signal received by a BS antenna and converter 1 is supplied to a scrambled signal decoder 16 and a BPF 4. In the scrambled signal decoder 16, a picture signal is derived and then detected by a decoder output detecting circuit 17. The detection result is supplied to a control microcomputer 15, so that a judgement is made as to whether or not the scrambled signal decoder 16 is in operation. If the scrambled signal decoder 16 is in operation, the changing switches 5 and 12 are set to the side of the scrambled signal decoder 16. If the scrambled signal decoder 16 is not operated, the power supply control signal is sent from the control microcomputer 15, whereby when the power supply of the scrambled signal decoder 16 is not turned ON, the switches 5 and 12 are set to the side of the normal broadcasting system. Accordingly, it is possible to prevent that the scrambled signal is received while the power supply of the scrambled signal decoder is turned OFF.

5 Claims, 4 Drawing Sheets

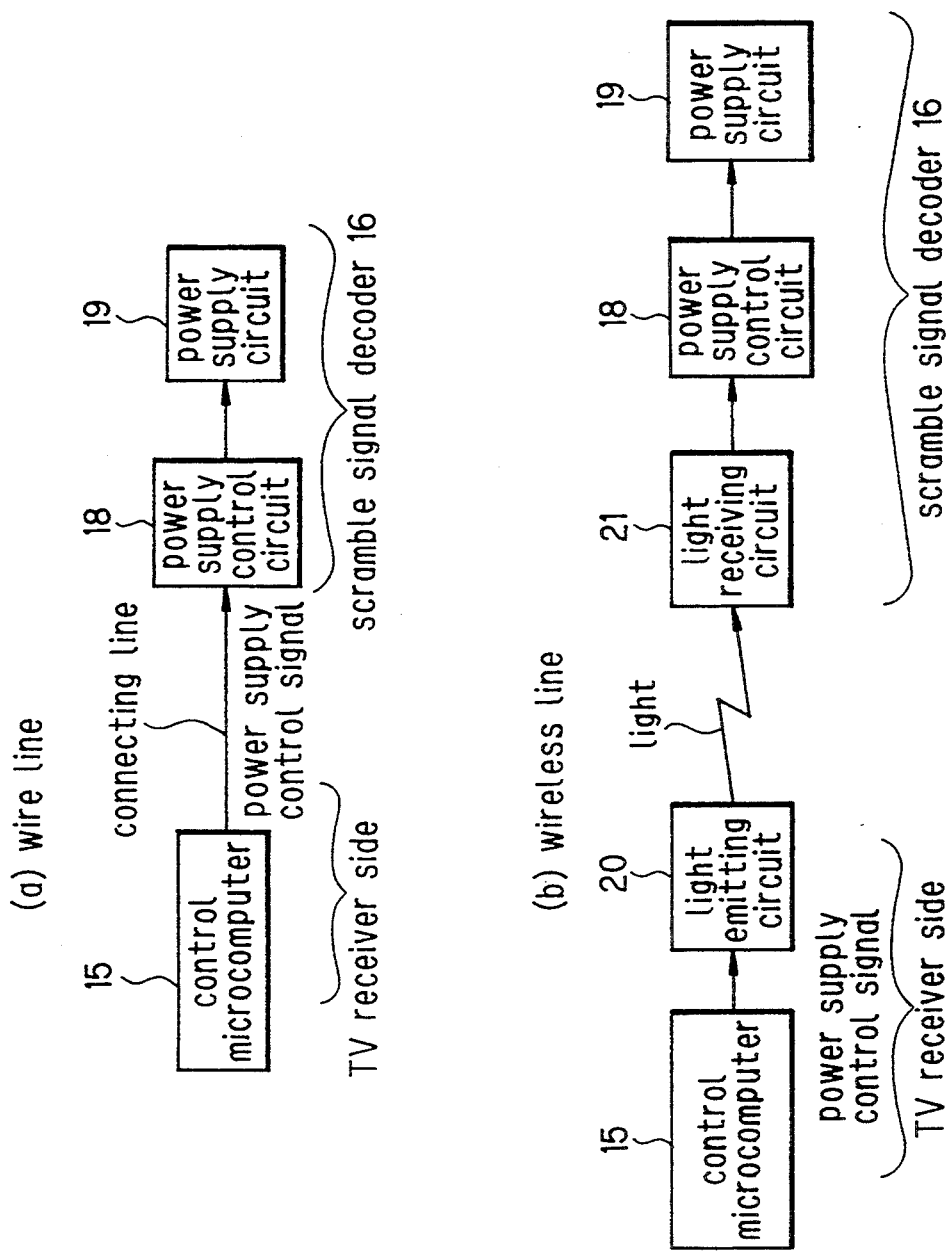

SIGNAL RECEIVING APPARATUS WITH AUTOMATICALLY ACTIVATED SCRAMBLED SIGNAL DECODER

This is a continuation of application Ser. No. 07/967,211, filed Oct. 27, 1992, now abandoned.

BACKGROUND OF THE INVENTION

1. Field of the Invention

The present invention relates to an apparatus for receiving a scrambled signal used in a CATV (cable television) system and a broadcasting satellite (BS) system.

2. Description of the Prior Art

In, for instance, a broadcasting satellite (BS) system and a communication satellite (CS) system, a so-called "pay television" type channel has been introduced. In this pay TV channel, either a picture or a sound is converted into a scrambled signal which is then broadcasted.

When such a pay TV signal is received by a television receiver equipped with a BS tuner, the scrambled signal which has been transmitted from the broadcasting station is decoded by a scrambled signal decoder, so that either the normal picture or the normal sound can be reproduced.

Generally speaking, such a scrambled signal decoder sent from a broadcasting station is connected to a main body of a TV receiver, and a rental fee is charged based on the time during which the scrambled signal decoder is in use.

Then, upon receipt of the scrambled signal, this scrambled signal decoder, and then the decoded picture signal or the decoded sound signal is returned to the TV receiver, so that the decoded picture or sound signal is outputted from a cathode-ray tube or a speaker.

On the other hand, in the above-described TV receiver equipped with the BS tuner, a power source of the TV receiver is independently provided with a power source of the scrambled signal decoder. Only when the scrambled signal is received, this scrambled signal decoder is used with a fee payment, but when other signals than the scrambled signal are received, the power source of the scrambled signal decoder is normally turned OFF.

As a consequence, there are some possibilities that the scrambled signal is received by the TV receiver when the power source for the scrambled signal decoder is turned OFF. In this case, while the scrambled signal is supplied from the TV receiver to the scrambled signal decoder, no signal is outputted from this TV receiver, and therefore no picture is displayed on a cathode-ray tube, nor is sound produced from a speaker.

In such a case, a viewer mistakenly believes that the TV receiver is out of order or subject to a malfunction.

SUMMARY OF THE INVENTION

The present invention has been made in an attempt to solve the above-described problems, and therefore has an object to provide a receiving apparatus applied to such a TV receiver for receiving a broadcasting satellite signal, capable of automatically turning ON a power supply switch of a scrambled signal decoder under such a condition that the scrambled signal decoder is not operated when the scrambled signal is received, and also capable of not supplying the scrambled signal to a cathode-ray tube, or a speaker when the scrambled signal decoder is not connected to the TV receiver.

To achieve the above-described object, a receiving apparatus, according to the present invention, capable of connecting thereto a scrambled decoder for decoding a scrambled signal used in a CATV system and a broadcasting satellite system, comprises decoder operating condition judging means for judging whether or not the scrambled decoder is operated; and selecting means for selecting an output from the scrambled signal decoder, or an output from an output processing signal employed in the receiving apparatus, depending upon the operation conditions of the scrambled signal decoder.

In a television receiver equipped with a BS tuner, to which the scrambled signal receiving apparatus of the present invention has been applied, a scrambled signal received by a BS (broadcasting satellite) antenna and BS converter 1 is detected by a PLL (phase-locked loop) detecting circuit 2. The detected scrambled signal is then supplied to a scrambled signal decoder 16 and a bandpass filter (BPF) 4.

An output from the scrambled signal decoder 16 is detected by a decoder output detecting circuit 17, and the resultant detection signal is supplied to a control microcomputer 15. As a result, it is judged whether or not the scrambled signal decoder 16 is in operation.

While the scrambled signal decoder 16 is in operation, in response to either a picture control signal or a sound control signal derived from the control microcomputer 15, either a changing switch 5 or a changing switch 12 is changed to the side of the scrambled signal decoder 16. As a result, the decoded picture signal, or the decoded sound signal is outputted from a cathode-ray tube 7 or a speaker 14.

If a judgement is made that the scrambled signal decoder 16 is not operated, a power supply control signal is sent out from the control microcomputer 15, so that the power supply of the scrambled signal decoder 16 is turned ON. Then, the changing switches 5 and 12 are changed to the side of the scrambled signal decoder 16.

Even when the power supply control signal is sent out, if the power supply of the scrambled signal decoder 16 is not turned OFF, namely no output is detected, a judgement is made that either the scrambled signal decoder 16 is not connected, or is brought into a malfunction, so that the changing switches 5 and 12 are changed to the side of the normal broadcasting channel. In this case, either the picture signal with the scramble state or the sound signal with the scrambled state is outputted from the cathode-ray tube 7 or the speaker 14.

BRIEF DESCRIPTION OF THE DRAWINGS

For a better understanding of the present invention, reference is made of the following descriptions in conjunction with the accompanying drawings, in which:

FIG. 4 is a diagram for explaining a method for controlling a power supply of the scrambled signal decoder.

DETAILED DESCRIPTION OF THE PREFERRED EMBODIMENTS

Referring now to drawings, a television receiver equipped with a BS (broadcasting satellite) tuner, to which a scramble signal receiving apparatus according to a preferred embodiment of the present invention has been applied, will be described in detail.

Figure 2:
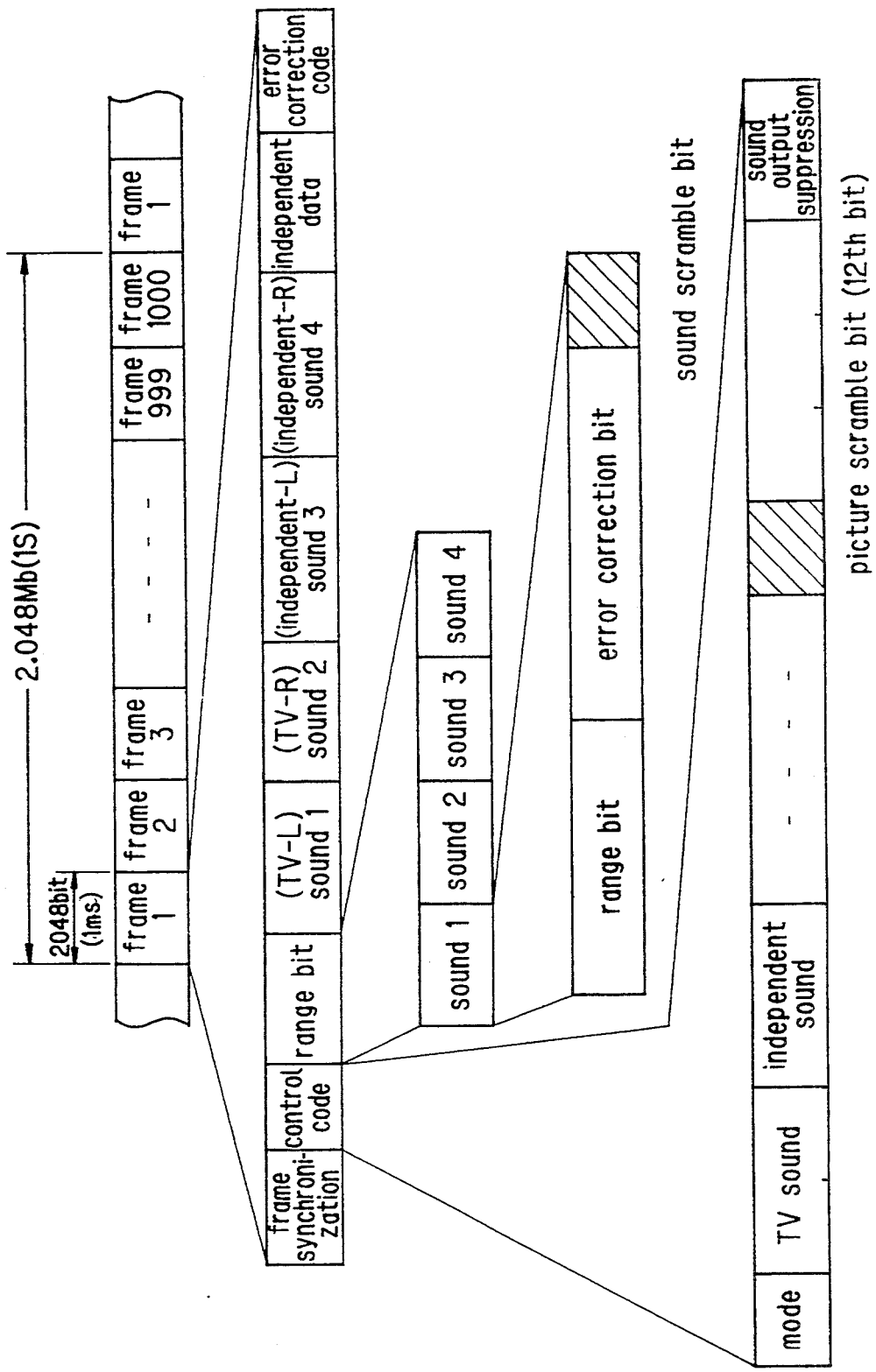
FIG. 2 is a diagram for explaining a sound signal of an A mode in a BS system.

In a BS (broadcasting satellite) system, a scrambled signal for a pay television broadcasting channel and a non-scrambled signal for a normal broadcasting channel are mixed. Then, information for representing whether or not a broadcasted signal corresponds to a scrambled signal is contained in both of a picture (video) signal and a sound (audio) signal. As will be described in detail, a judgement is made whether or not the broadcasted signal corresponds to the scrambled signal by analyzing the sound signal. In FIG. 2, there is shown an arrangement of a sound signal of a BS system in an A mode.

As represented in FIG. 2, the sound (audio) signal of the BS system corresponds to a digital signal whose frame 1 is constructed of 2,048 bits. This digital signal is transmitted at a rate of 1000/second. First 16-bit data of the frame arrangement is a synchronizing code called as "a frame synchronization", and is provided in order that a bit clock can be readily generated at the receiver side.

The 16-bit data subsequent to the frame synchronization is referred to a "control code", and represents a transmitting mode. This control code contains various codes used to discriminate an A mode from a B mode; a TV sound from an independent sound; a stereophonic sound from a monophonic sound, and also used to make a discrimination as to whether or not a picture has been scrambled, and further to make a discrimination as to whether or not a control is required to suppress undesirable noise produced when the mode is selected, or the TV program station is selected.

In this case, when a picture scramble bit becomes "1", this bit represents that the picture signal is scrambled, whereas when the picture scramble bit becomes "0", this bit indicates that the picture signal is not scrambled. At the receiver side, the reception mode is changed based on this control code.

The subsequent range bit is constructed of 32 bits, in which 8 bits are allocated to 1 sound channel. The first 3 bits of the 32-bit range bit represent a range number, and the subsequent 4 bits are used to correct an error occurring in the data transmission.

Then, the last 1 bit of the 32-bit range bit corresponds to a sound scramble bit for indicating whether or not a sound signal in this channel has been scrambled. That is to say, if this last 1 bit is "1", then the sound signal has been scrambled, whereas if this last 1 bit is "0", then the sound signal has not been scrambled.

A next sound area is subdivided into four areas, and a sound signal related to a picture is transmitted. Subsequent independent data is used to transmit information independent from the sound signal. An error correction code of the last frame arrangement is constructed of $7 \times 32$ bits, and attached to both of sound data and independent data except for the frame synchronizing signal and the control code. Based upon this error correction code, a correction can be made with respect to a 1-bit error occurring in the data transmission, and also a detection can be made with regard to a 2-bit error.

Figure 1:
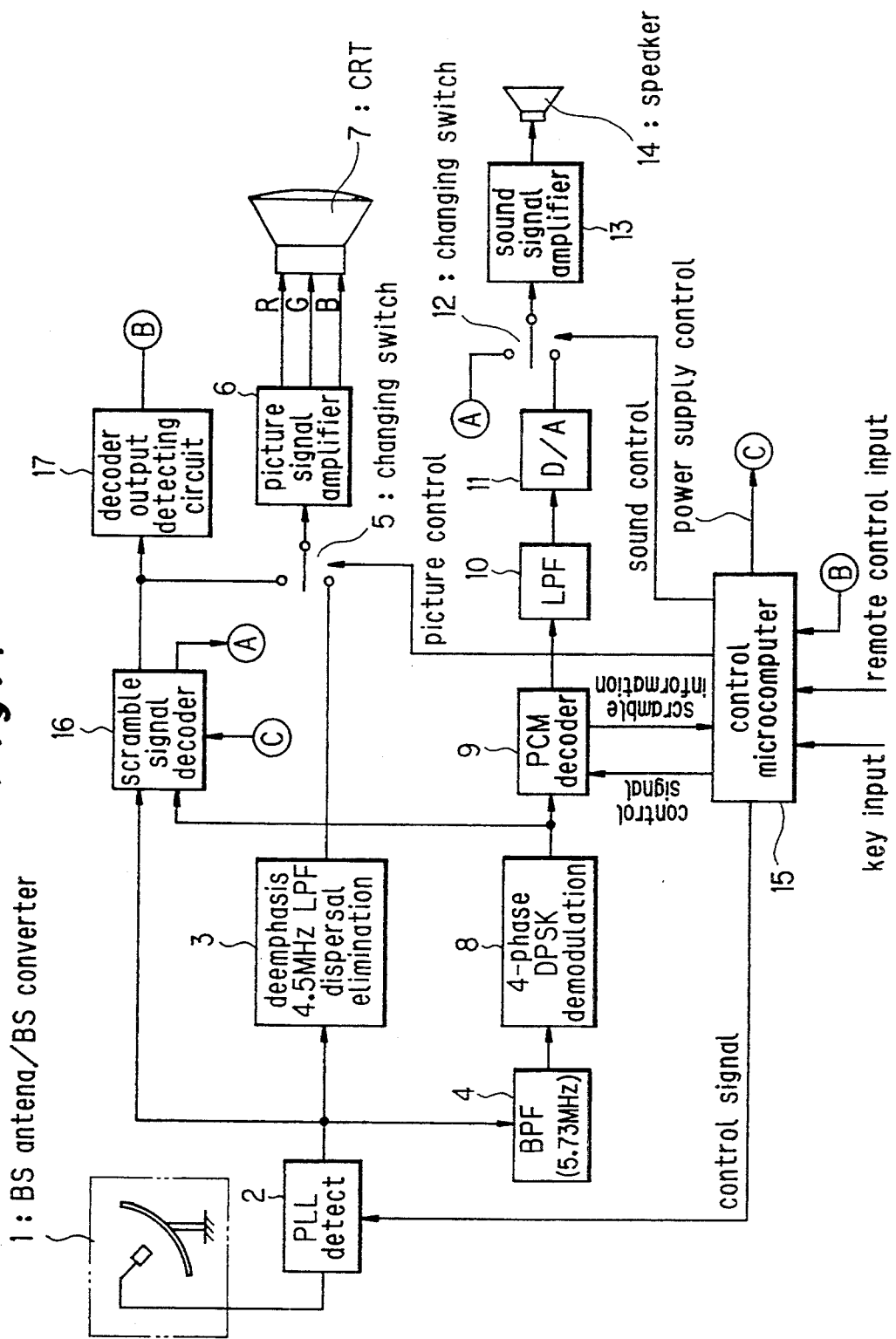
FIG. 1 is a schematic block diagram showing an arrangement of a television receiver equipped with a BS tuner, to which a scrambled signal receiving apparatus according to the present invention has been applied.

Now, in FIG. 1, there is shown an arrangement of a television receiver equipped with a BS tuner, into which a scrambled signal receiving apparatus according to the present invention has been applied. For the sake of simple explanation, only 1 channel is represented as to the sound signal, and also only a BS-signal receiving circuit portion required for explaining the idea of the present invention is indicated.

In FIG. 1, a signal received by a BS antenna/BS converter 1 is PLL-detected by a PLL (phase-locked loop) detecting circuit 2. When a non-scrambled signal of a normal TV broadcasting system is received, an output from the PLL detecting circuit 2 is supplied to a deemphasis circuit 3 and a bandpass filter (BPF) 4.

In the deemphasis circuit 3, the high frequency component of the received signal is returned to the original frequency component thereof. A sound PCM (pulse code modulation) subcarrier signal component ($5.73 \pm 0.5$ MHZ) is removed from the received signal in the lowpass filter 4 having a passband of 4.5 MHZ, so that the picture signal is extracted. The extracted picture signal is supplied via the changing switch 5 and a picture signal amplifying circuit 6 to a CRT (cathode-ray tube) 7. Thus, a picture is displayed on a screen of the CRT 7o It should be noted that the changing switch 5 is changed by receiving an instruction of the control microcomputer 15 (this will be described later).

On the other hand, the sound PCM sub-carrier having a frequency of 5.73 MHz is derived from the input signal in the BPF (bandpass filter) 4 and then is supplied to a 4-phase DPSK (differential phase-shift keying) demodulator 8. In this demodulator 8, the sound PCM subcarrier signal is demodulated to obtain a bit stream signal (see FIG. 2). This demodulated signal is furnished to a PCM decoder 9 in which various processes such as deinterleave, error correction, channel selection, mode selection and interpolation are carried out.

In an LPF (lowpass filter) 10, an undesirable high frequency component of an output signal from the PCM decoder 9 is removed and the resultant signal is D/A-converted into an analog signal by a D/A converter 11. Then, this analog signal is supplied via the changing switch 12 to a sound (audio) signal amplifying circuit 13 so as to be amplified. The amplified signal is thereafter supplied to the speaker 14 to be outputted as a sound. It should also be noted that the changing switch 12 is controlled in response to an instruction of the control microcomputer 15.

The output signal from the PCM decoder 9 is furthermore supplied to the control microcomputer 15 in which both of the above-described picture scramble bit and sound scramble bit contained in the sound signal are analyzed. Then, when the bit information is "0", since it indicates that the output signal corresponds to the non-scrambled signal, both of the changing switch 5 and the changing switch 12 are changed to the side of the normal broadcasting system, namely the side of the deemphasis circuit 3 and the D/A converter 11 in response to the picture control signal and the sound control signal derived from the control microcomputer 15.

If either the picture scramble bit or the sound scramble bit becomes "1", it indicates that this broadcasted signal corresponds to the scrambled signal.

Subsequently, a description will now be made of such a case that a scrambled signal is received. In this case, the output from the PLL detecting circuit 2 is supplied to the scramble decoder 16 and the BPF 4. The picture signal decoded in the scramble signal decoder 16 is furnished to the CRT 7 via the changing switch 5 and the picture signal amplifying circuit 6.

On the other hand, in the BPF 4 and the 4-phase DPSK demodulator 8, the process similar to that of the normal broadcasting system is carried out. Then, the bit stream signal outputted from the 4-phase DPSK demodulator 8 is supplied to the scrambled signal decoder 16 so that the sound (audio) signal is decoded. This sound signal is supplied via the changing switch 12 and the sound signal amplifying circuit 13 to the speaker 14.

The bit stream signal outputted from the 4-phase DPSK demodulator 8 is also supplied to a PCM decoder 9 in which information about the sound scramble bit is derived from the bit stream signal. The sound scramble bit information is supplied to the control microcomputer 15. As a result, it is judged whether or not a channel signal under reception corresponds to the scrambled signal.

Also, the picture signal decoded from the scrambled signal decoder 16 is supplied to a decoder output detecting circuit 17. This decoder output detecting circuit 17 detects whether or not the picture signal is outputted from the scrambled signal decoder 16.

Then, the control microcomputer 15 judges whether or not the scrambled signal decoder 16 is in operation. In other words, if the picture signal is outputted from the scrambled signal, decoder 16, then the scrambled signal decoder 16 is in operation, If the picture signal is outputted from the scrambled signal decoder 16, the scrambled signal decoder 16 is not operated.

When it is judged that the scrambled signal decoder 16 is in operation, the changing switch 5 is changed to the side of the scrambled signal decoder 16 in response to the picture control signal derived from the control microcomputer 15, and the picture signal decoded by the scrambled signal decoder 16 is furnished to the cathode-ray tube 7.

To the contrary, when it is judged that the scrambled signal decoder 16 is not operated, the power supply control signal is sent from the control microcomputer 15 and then supplied to the scrambled signal decoder 16.

The power supply control signal sent from the control microcomputer 15 may be supplied via a wire line or by wireless to the scrambled signal decoder 16.

In case of the wire line, as shown in FIG. 4a, the power supply control signal is supplied to a power supply control signal 18 of the scrambled signal decoder 16, so that the power supply circuit 19 is turned ON/OFF.

In case of wireless transmission, as indicated in FIG. 4b, the power supply control signal sent from the control microcomputer 15 is converted into light in a light emitting circuit 20, and the light receiving circuit 21 of the scrambled signal decoder 16. An output from this light receiving circuit 21 is supplied to a power supply control circuit 18, whereby a power supply circuit 19 is turned ON/OFF.

Then, when the power supply of the scrambled signal decoder 16 is turned ON, a process is performed which is similar to the above-described case that it is judged in which the scrambled signal decoder 16 is in operation, so that either the picture signal or the sound signal decoded by the scrambled signal decoder 16 is outputted from either the CRT 7 or the speaker 14.

For instance, if either the scrambled signal decoder 16 is not connected to the TV receiver, or the power supply is not turned ON due to some reason even when the scrambled signal decoder 16 is surely connected to the TV receiver, the changing switch 5 is set to the side of the deemphasis circuit 3 and also the changing switch 12 is set to the side of the D/A converter 11.

As a consequence, either the picture signal under scrambled condition, or the sound signal under scrambled state is supplied to the CRT 7 or the speaker 14. At this time, either a meaningless picture or a meaningless sound is outputted.

It should be noted that the control microcomputer 15 is controllable in response to a key input and a remote control input of a TV receiver. Either the picture receiving channel or the sound receiving channel can be selected by controlling the PLL detecting circuit 2 or the PCM decoder 9 under control of this control microcomputer 15.

Figure 3:
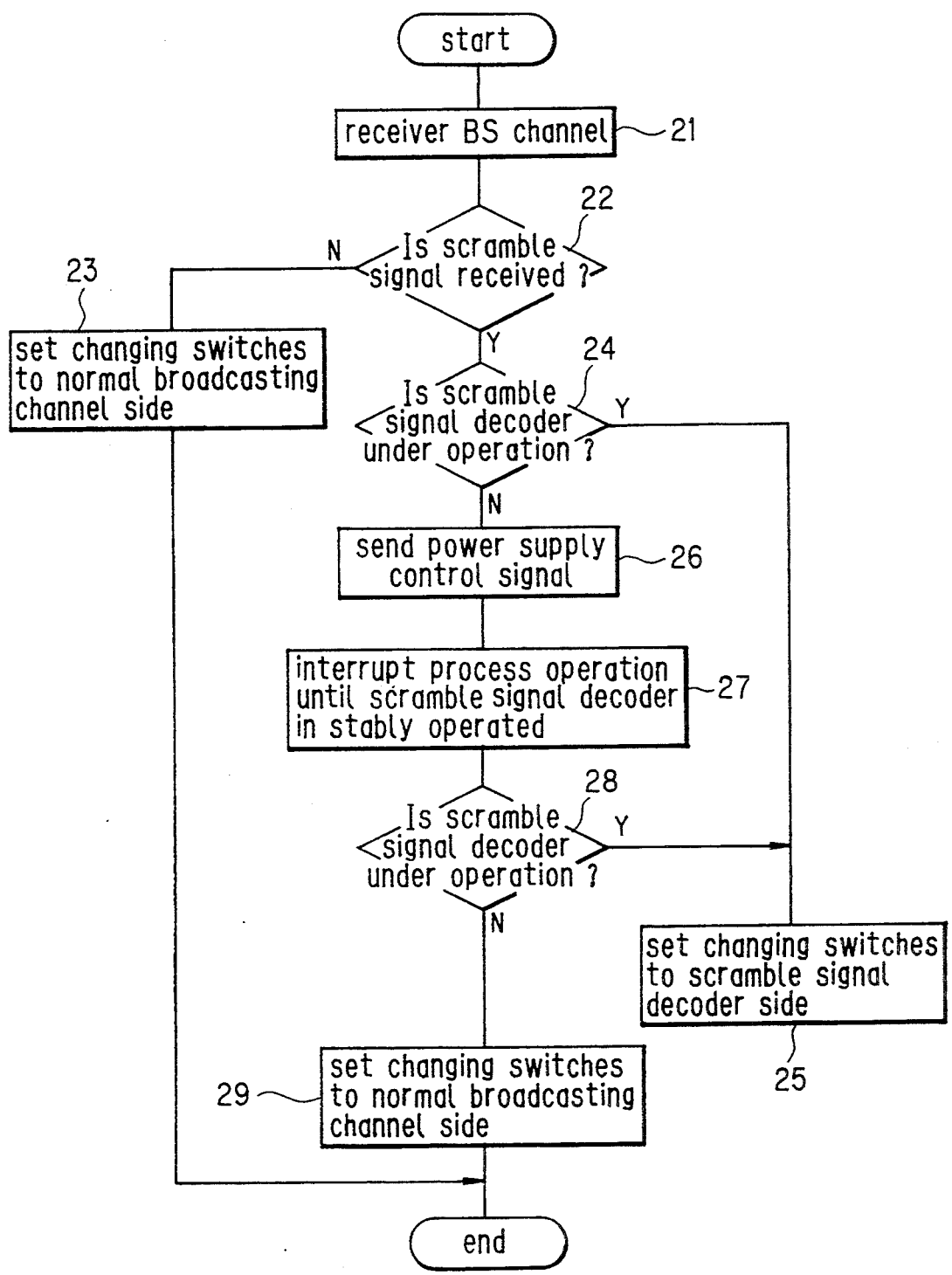
FIG. 3 is a flow chart for describing a major selecting process effected in the TV receiver of FIG. 1.

FIG. 3 is a flow chart for explaining a process sequence of the above-described output selecting process 20. First, upon receipt of the BS signal (step 21), a judgement is subsequently made as to whether or not the received signal corresponds to the scrambled signal by analyzing the scrambled information contained in the sound signal (step 22). When it is judged that the received signal is not such a scrambled signal, both of the changing switches 5 and 12 are set to the side of the normal broadcasting system (step 23). Then, this output selecting process 20 is accomplished.

At the step 22, when it is judged that the received signal corresponds to the scrambled signal, another check is done whether or not the scrambled signal decoder 16 is in operation (step 24). Now if a judgement is made that the scrambled signal decoder 16 is in operation, both of the changing switches 5 and 12 are changed to the side of the scrambled signal decoder 16 (step 25). Thus, the output selecting process 20 is ended.

At the previous step 24, when it is judged that the scrambled signal decoder 16 is not operated, the power supply control signal is supplied from the control microcomputer 15 to the scrambled signal decoder 16 (step 26).

Subsequently, the output selecting process operation is interrupted for a predetermined time until the operation of the scrambled signal decoder 16 becomes stable (step 27). Thereafter, a check is again made as to whether or not the scrambled signal decoder 16 is under operation (step 28). If it is judged that the scrambled signal decoder 16 is in operation, then both of the changing switches 45 and 12 are set to the side of the scrambled signal decoder 16 at the step 25. Accordingly, this output selecting process 20 is completed.

To the contrary, when it is judged that the scrambled signal decoder 16 is not in operation, the changing switches 5 and 12 are set to the side of the normal broadcasting system (step 29), so that this selecting process 20 is ended.

It should be noted that although the processes (defined from the steps 26 to 28) from the transmission of the power supply control signal to the operation judgement of the scrambled signal decoder are performed only once in the above-described preferred embodiment, this process may be carried out more than 1 time.

Also, the scrambled signal receiving apparatus according to the present invention has been applied to the television receiver equipped with the BS tuner capable of receiving the BS channel in the above-explained preferred embodiment. Alternatively, this scrambled signal receiving apparatus may be applied to a television receiver capable of receiving the CS channel, and also a CATV.

As previously described, according to the present invention, in the receiving apparatus capable of connecting the scrambled signal decoder, a check is done as to whether or not the scrambled signal decoder is in operation, and a selection is made between the output derived from the scramble signal decoder and the output derived from the output process circuit employed in the receiving apparatus based upon the judging result. Then, the selected output signal is further processed.

As a consequence, if the scrambled signal receiving apparatus of the present invention is applied to a television receiver equipped with a BS tuner and a television receiver equipped with a CS tuner, when the power supply of the scrambled signal decoder is turned ON while receiving the scrambled signal, either the picture signal or the sound signal decoded by the scrambled signal decoder is outputted to either the CRT or the speaker. Conversely, when the power supply of the scrambled signal decoder is turned OFF, the power supply can be automatically turned ON.

There is another merit: When the scrambled signal decoder is not connected to the above-described TV receiver, the received scrambled signal is directly outputted to the CRT or the speaker. Accordingly, since neither the picture nor the sound is produced from the TV receiver, it can be prevented that an operator mistakenly recognizes that the TV receiver is subject to a malfunction.

What is claimed is:

1. A signal receiving apparatus for receiving a scrambled or non-scrambled signal in a CATV system or a broadcast satellite system, said apparatus comprising:

signal receiving means for receiving a TV signal including a video signal and an audio signal;

processing means for processing said received signal;

first judging means for judging whether said received signal is scrambled or non-scrambled;

scrambled signal decoder means responsive to said first judging means for decoding the scrambled signal to produce a decoded signal when said received signal is scrambled;

second judging means for judging whether or not said scrambled signal decoder means is in operation;

selecting means responsive to said second judging means for selecting said decoded signal when said scrambled signal decoder means is in operation and otherwise selecting said non-scrambled signal.

2. A satellite broadcast signal receiving apparatus according to claim 1 further comprising a control microcomputer, and wherein, when said first judging means judges that said received signal is scrambled and said second judging means judges that said scrambled signal decoder means is not in operation, said control microcomputer supplies a power supply control signal to said signal decoder to place it in operation.

3. A satellite broadcast signal receiving apparatus according to claim 2 further comprising means responsive to said power supply control signal for interrupting operation of said selecting means until operation of said scrambled signal decoder means becomes stable.

4. A satellite broadcast signal according to claim 1 wherein said video signal and said audio signal are both scrambled.

5. A satellite broadcast signal apparatus according to claim 2 further comprising wireless means for transmission of said power supply control signal.

* * * * *